United States Patent [19]

Zarembo

[11] Patent Number: 4,677,799
[45] Date of Patent: Jul. 7, 1987

[54] MULTI-SECTIONAL RACEWAY

[75] Inventor: Peter J. Zarembo, Shoreview, Minn.

[73] Assignee: Minnesota Mining and Manufacturing Company, St. Paul, Minn.

[21] Appl. No.: 804,041

[22] Filed: Dec. 3, 1985

[51] Int. Cl.⁴ .............................................. E04B 5/48
[52] U.S. Cl. ...................................... 52/220; 14/69.5; 52/177; 52/221; 104/275
[58] Field of Search ................. 52/220, 221, 716, 588, 52/459–464, 177; 14/69.5; 104/275; 174/68 C; 404/35–41

[56] References Cited

U.S. PATENT DOCUMENTS

| 72,028 | 12/1867 | Haase | 104/275 |
|---|---|---|---|
| 594,465 | 11/1897 | Crane | 104/275 |
| 1,838,746 | 12/1931 | Day | 104/275 |
| 1,956,125 | 4/1934 | Leister | 104/275 |
| 2,299,356 | 10/1942 | Strohm et al. | 104/275 |
| 3,182,343 | 5/1965 | Larson | 14/69.5 |
| 3,423,780 | 1/1969 | Alten | 14/72 |
| 3,846,945 | 11/1974 | Roby | 52/177 |
| 3,971,076 | 7/1976 | Jaquet | 324/41 |
| 3,984,891 | 10/1976 | Weinmann | 14/69.5 |
| 4,101,100 | 7/1978 | Smith et al. | 244/114 |
| 4,135,183 | 1/1979 | Heltemes | 340/572 |
| 4,308,530 | 12/1981 | Kip et al. | 340/572 |
| 4,468,910 | 9/1984 | Morrison | 52/177 X |
| 4,531,117 | 7/1985 | Nourse et al. | 340/572 |

FOREIGN PATENT DOCUMENTS

| 7701096 | 8/1978 | Netherlands | 52/177 |
|---|---|---|---|
| 550506 | 1/1943 | United Kingdom | 104/275 |

OTHER PUBLICATIONS

National Electric Products Corporation of Pittsburgh, PA, 1938 Catalog and Handbook, pp. 67, 68.

Primary Examiner—J. Karl Bell
Attorney, Agent, or Firm—Donald M. Sell; James A. Smith; William B. Barte

[57] ABSTRACT

A multi-sectional raceway is used in combination with a pair of interconnected panels of a detection system. The panels are attached to the ends of a pair of support beams, and electrical wiring runs between the panels. The raceway runs between the panels, and is comprised of two ramp sections and a platform section interlocked to provide ease of assembly and flexibility. The sections are flexibly interconnected by pressure engageable male members depending from the lower surface of the platform section at opposite ends with generally U-shaped female members located on the leg portions extending from the raised abutting end of each ramp section. The raceway also includes at least one generally E-shaped girder structure running underneath the entire width of the platform section to define at least one passageway for the protection of electrical wiring running therealong. In addition, the raceway includes at least two generally U-shaped channels running along the lower surface of the platform section to provide minimum clearance for the pair of beams running therethrough which interconnect and support the panels attached thereto. Thus, the forces associated with travel over the top of the raceway are isolated from the beams and the interconnected panels to prevent wobbling of the panels.

14 Claims, 4 Drawing Figures

MULTI-SECTIONAL RACEWAY

FIELD AND BACKGROUND OF THE INVENTION

The present invention relates to a detection system and more particularly, a raceway which runs between a pair of panels of a detection system to protect electrical wiring and the like running between the panels.

Detection systems of, for example, the types described in U.S. Pat. Nos. 4,531,117; 4,308,530; 4,135,183; and 3,971,983 generally include an electromagnetic transmitter and receiver for detecting the passage of certain objects, such as tags, markers or metallic items, through the systems. The transmitter usually emits a large signal to which the object responds to result in the production of a low level signal which is detected by the receiver. The system, in order to detect the presence of an object must be able to distinguish between the transmitted and received signals and any unwanted signals. Thus, the above systems are designed so that the transmitter and receiver antennas are nulled to minimize pick-up by the receiving antenna of the transmitted signal. This enhances the detection by the receiver of the much smaller object signal. In addition, it is well known in the art to include a raceway between the panels of such systems to permit travel between the panels over electrical wiring and the like running between the panels.

However, there are several limitations associated with such detection systems utilizing prior raceways. For example, the raceways are generally constructed of a single plate of metal, such as aluminum, which in addition to being heavy, cannot be adjusted in the field to vary the distance between the panels. In addition, prior raceways have been attached directly to the panels which resulted in the load forces associated with travel upon the raceways being transferred to the panels and causing them to wobble or vibrate. Even minute movement of the panels drastically affects the nulled condition between the antennas, and thus interferes with the receipt of the object signal. To compensate, such systems were designed or adjusted to allow for this error by utilizing larger tags or markers. This prevented the systems from attaining optimum sensitivity.

It is conventional to provide protective ramps or bridges, for hoses, cables, wires and the like. For example, bridges for protecting fire hoses are illustrated in U.S. Pat. Nos. 1,956,125; 1,838,746; 594,465; and 72,028. Bridges or cross-overs for electrical wires or cables have also been suggested, as illustrated in U.S. Pat. No. 2,299,356. Further, ramps have also been disclosed for protecting a combination of air hoses and electrical cables, as illustrated in U.S. Pat. No. 4,101,100. However, it has not been suggested that the above structures could be used to isolate the forces associated with travel thereupon to substantially prevent wobbling or vibration of a pair of interconnected panels in close proximity with the structure, and to protect electrical wires and the like running between the panels.

In addition, bridges and ramps have been utilized to accommodate various differences in height between two surfaces to permit movement of wheeled vehicles thereacross, as illustrated in U.S. Pat. Nos. 3,984,891; and 3,423,780. Such structures, like the prior protective devices, are rigid and do not isolate forces associated with travel thereupon to prevent such forces from being transferred to adjacent structures in close proximity.

The prior raceways, as discussed above, do not address the problem of isolating traffic forces from transmission to adjacent panels of a detection system. This isolation of forces is complicated by the fact that electrical wires must pass beneath the raceway and between the panels, and that the panels must be supported in some manner. In addition, despite the need for the system to isolate traffic forces and protect electrical wiring, it must be capable of being assembled in the field and capable of varying with the necessary distance between the panels. Also, it must only be slightly inclined and as flat as possible to minimize interference with travel through the detection system. Further, it must be easy to assemble, disassemble, ship and store. Finally, notwithstanding the above, the raceway must be of sufficient strength and sturdiness to withstand the weight and force associated with travel upon it.

SUMMARY OF THE INVENTION

The invention described herein provides a multi-sectional raceway for use in combination with a pair of interconnected and supported panels of a detection system. The panels are attached to the ends of a pair of support beams, and electrical wiring and the like runs between the panels. The raceway runs between the panels and includes a first ramp section and a second ramp section interlockingly attached to opposite ends of a central platform section to form a smooth continuous upper surface. In addition, a generally E-shaped girder runs along the width of the lower surface of the platform section. The girder opens toward the lower surface and is closed by the lower surface to permit the unrestricted passage of the electrical wiring therethrough between the panels. Further, two generally inverted U-shaped channels run along the width of the raceway near the attached portions of the raceway sections to provide a clearance which accommodates each support beam. The beams are so situated within the channels so as to isolate the raceway from the panels to prevent the transmission of forces associated with travel upon the raceway to the panels. Also, the amount of clearance provided is minimized to reduce the overall height and incline of the raceway.

The ramp sections and the platform section are lockingly interconnected by means of corresponding, pressure engageable male members and female members. The interconnections include bearing surfaces which allow for ease of assembly. In addition, the male members and female members each include teeth which interlock the sections upon pressure engagement.

To provide limited resilience and a reduction in overall weight, a plurality of ribs run along the entire width of the lower surfaces of the ramp sections.

DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

Figure 1:
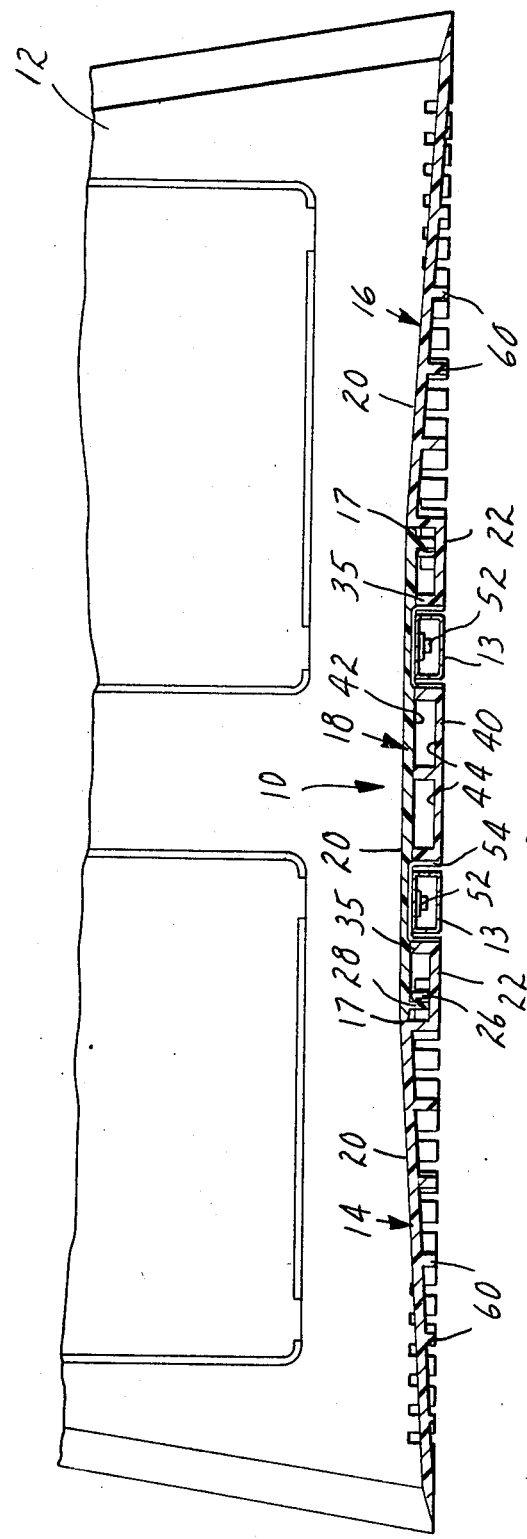
FIG. 1 is a cross-sectional view of the multi-sectional raceway of the present invention and a portion of a detection system panel.
Figure 2:
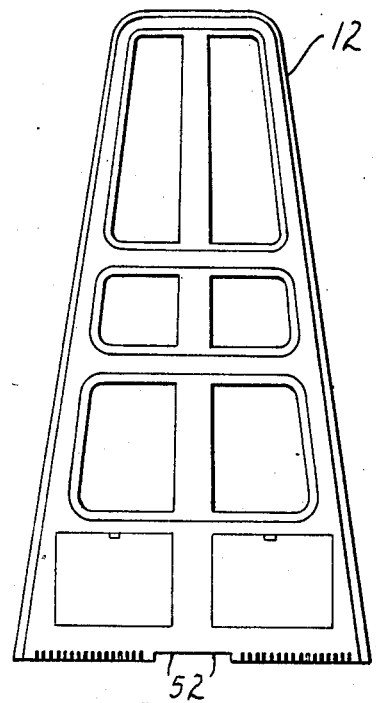
FIG. 2 is a side view of a detection system panel used in combination with the present invention.
Figure 3:
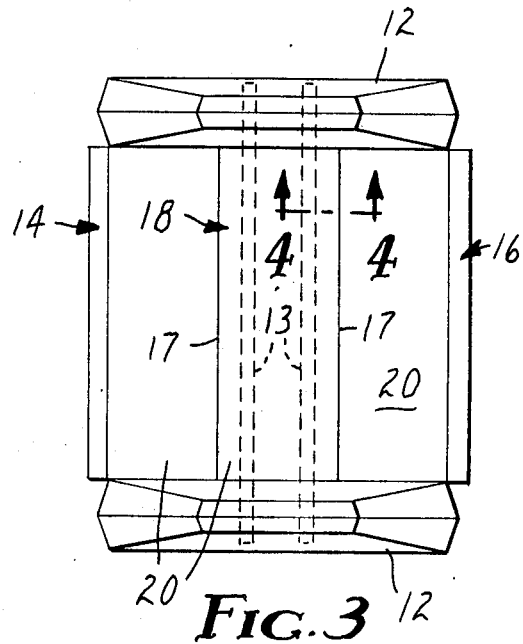
FIG. 3 is a plan view of the raceway of the present invention running between a pair of detection system panels.

Referring to FIGS. 1, 2 and 3 of the drawings, a multi-sectional raceway of the present invention, generally designated 10, is used in combination with a pair of interconnected panels 12 of a detection system. The panels are attached to the ends of a pair of support beams 13, and electrical wiring and the like runs between the panels 12. The raceway 10 runs between the panels 12, and includes a first ramp section 14 and a second ramp section 16 interlockingly attached at their raised abutting ends 17 to opposite ends of a central platform section 18 to form a smooth continuous upper surface 20. Thus, it is contemplated that the raceway 10 be placed between the panels 12 of detection systems of, for example, the types described in U.S. Pat. Nos. 4,531,117; 4,308,530; 4,135,183; and 3,971,983, the disclosures of which are hereby incorporated by reference. The particular detection system is not essential to the present invention, except that the particular system must require that the panels be interconnectingly supported and that wiring and the like run between the panels. In addition, it is necessary that relative movement be restricted, such as wobbling and vibration of the panels of the particular detection system.

Figure 4:
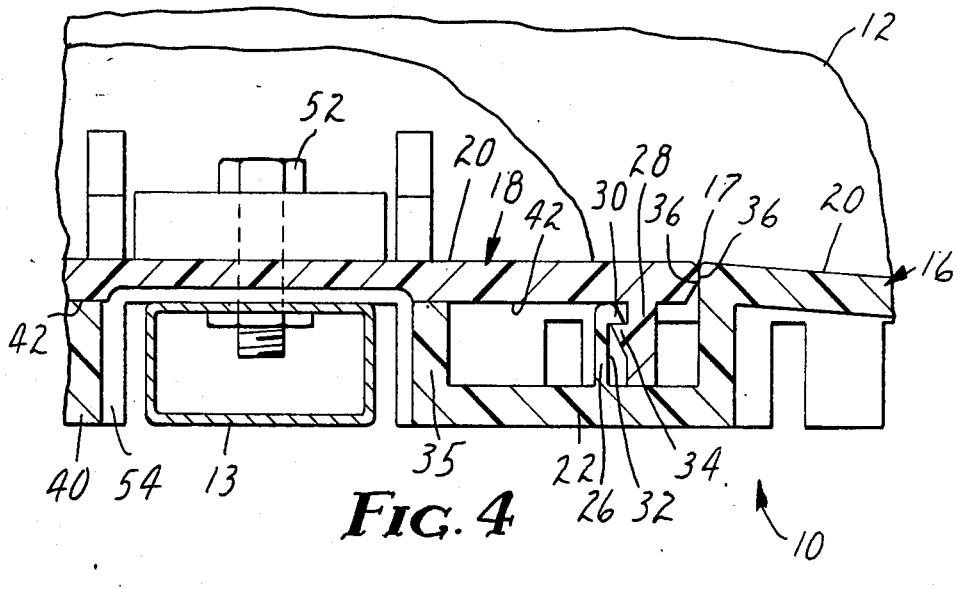
FIG. 4 is an enlarged fragmentary cross-sectional view of the details of the means for lockingly interconnecting the ramp sections and the platform sections, taken in the direction of arrows 4—4 of FIG. 3.

The raised abutting ends 17 of the ramp sections 14 and 16 each include a horizontal leg portion 22 extending from each abutting end. Each leg portion 22 includes a generally C-shaped female member 26 which opens toward and is engageable with a corresponding male member 28 depending from each end of the central platform section 18, as illustrated in FIGS. 1 and 4. Each female member 26 and male member 28 are deformable under pressure engagement and interlock by means of a tooth 30 located on the inner wall 32 of the female member 26, and a tooth 34 located on the male member 28. In addition, each leg portion 22 includes an upright support member 35 projecting therefrom. The support members 35 provide support to the central platform section 18. The sections 14, 16 and 18 each include bearing surfaces 36 which come in contact during assembly to provide ease of assembly.

A girder 40 runs along the lower surface 42 of the central platform section 18 to provide strength and stiffness, and to define at least one rigid passageway 44 for the electrical wiring and the like to pass beneath the raceway 10 between the panels 12. In the preferred embodiment, as illustrated in FIG. 1, a generally E-shaped girder 40 opens toward the lower surface 42 and is closed by the lower surface to define two separate passageways 44. It should be appreciated that the girder could be of a variety of shapes, such as tubular.

As illustrated in FIGS. 1 and 4, the panels 12 are interconnected and supported by the pair of support beams 13 running beneath the raceway 10 and attached to the panels by suitable fasteners 52, such as nuts and bolts. The particular support means is not essential to the present invention, and other means upon which the panels may be interconnectingly supported may be utilized. The panels 12 are not attached to the raceway 10, and to insure that the beams 13 do not contact the raceway 10 during travel upon it, two corresponding generally inverted U-shaped channels 54 are provided along the width of the raceway 10 to provide spaces or clearances between the lower surface 42 of the platform section 18 and the support beams 13. Thus, the load forces associated with travel upon the upper surface 20 of the raceway 10 are isolated and not transmitted to the panels 12 to prevent them from wobbling or vibrating, which would otherwise materially affect the operation of the detection system or at a minimum affect its operational sensitivity. In addition, the amount of clearance is minimized to reduce the overall height and incline of the raceway 10 so as to not unduly interfere with travel through the detection system between the panels.

A plurality of ribs 60 run along the entire width of the ramp sections 14 and 16 to provide stability and a reduction in overall weight. Further, a non-skid surface, mat or the like, not shown, may be placed along the upper surface 20 of the raceway 10. In addition, the non-skid surface may be formed in the upper surface 20.

The raceway 10 may be made of different suitable polymeric materials or metals which possess the desired strength, flexibility and resilience. The raceway 10 may be manufactured by several manufacturing processes well known to those skilled in the art depending upon the particular material utilized. In the preferred embodiment, the sections 14, 16 and 18 are made by extruding a suitable polymeric material, such as polyvinyl chloride.

While a preferred embodiment of the present invention has been described so as to enable one skilled in the art to practice the device of the present invention, the preceding description is intended to be exemplary and should not be used to limit the scope of the invention. The scope of the invention should be determined only by reference to the following claims.

What is claimed is:

1. A multi-sectional raceway for use in combination with a pair of detection system panels, interconnected by at least one support beam, to protect electrical wires and the like passing between the panels and to permit travel between the panels without materially affecting the operation of the system, comprising:

a generally rectangular central platform section having an upper surface, a lower surface, and a first end and a second end opposite said first end;

a first ramp section and a second ramp section, each of said ramp sections having an upper surface, a lower surface, and a raised end adapted to abut with one of said first or second ends;

interlocking means associated with said raised abutting ends of said ramp sections, and with said first end and said second end of said central platform section for lockingly interconnecting said ramp sections and said central platform section to form a continuous upper surface; and girder structure means running the width of said central platform section lower surface and having a substantially flat base for distributing loads applied thereto, and a plurality of arms extending from the base adapted to bear against and support a said platform section, at least one passageway being formed between said arms for permitting and protecting electrical wiring which may be positioned along said passageway to electrically connect the panels, wherein said support beams interconnecting said detection panels have a predetermined cross-sectional configuration, and wherein said platform section, ramp sections and girder means are further dimensioned relative to said predetermined configurations to form in combination when assembled together at least one channel running along the lower surface of the platform section and between the outer edge of the girder means and the raised end of the ramp sections, within which may be accommodated in a non-engaging relationship at least one said support beam thereby isolating load forces associated with said travel upon said raceway between said panels from said panels to prevent wobbling of said panels.

2. The multi-sectional raceway defined in claim 1, wherein said interlocking means includes a leg portion extending from each of said raised abutting ends of said ramp sections, said interlocking means also includes a male member depending from the lower surface of said first end and said second end of said central platform section, and each of said leg portions has a generally U-shaped female member opening towards said depending male member, whereby pressure engagement of each of said male members with each of said female members causes said sections to interlock.

3. The multi-sectional raceway defined in claim 2, wherein each male member includes a tooth and each female member includes a tooth, which come in pressure contact with one another to lock each of said female members and said male members together.

4. The multi-sectional raceway defined in claim 3, further comprising a bearing surface associated with said raised abutting ends of said ramp sections, and said first end and said second end of said central platform section to provide ease of assembly.

5. The multi-sectional raceway defined in claim 1, wherein said girder structure means is of generally E-shaped configuration and opens toward said central platform section lower surface to define two passageways therein.

6. The multi-sectional raceway defined in claim 1, wherein said first ramp section and said second ramp section include a plurality of rib members to reduce the overall weight of said raceway.

7. The multi-sectional raceway defined in claim 1, wherein said sections are adapted to include two channels, one of said channels running along said central platform section lower surface near said first end, and said other channel running along said central platform section lower surface near said second end to accommodate a pair of support beams.

8. A detection system, comprising:
a pair of panels interconnected by at least one support beam having a predetermined cross-sectional configuration, and;
a raceway running between the panels, and including a generally rectangular central platform section, a first ramp section, a second ramp section, means for interconnecting said ramp sections to said central platform sections and girder structure means;
said generally rectangular central platform section having an upper surface, a lower surface, and a first end and a second end opposite said first end;
said first ramp section and said second ramp section each having an upper surface, a lower surface, and a raised end which abuts one of said first or second ends;
said interlocking means having members associated with said raised abutting ends of said ramp sections, and with said first end and said second end of said central platform section for lockingly interconnecting said ramp sections to said platform section to form a continuous upper surface; and
said girder structure means running the width of said central platform section lower surface and having a substantially flat base for distributing loads applied thereto, and a plurality of arms extending from the base adapted to bear against and suppport a said platform section, at least one passageway being formed between said arms for permitting and protecting electrical wiring connecting the panels to be positioned therealong, said platform section, ramp sections and girder means being further dimensioned relative to said predetermined configurations of said at least one support beam to form in combination at least one channel running along the lower surface of the platform section and between the outer edge of the girder means and the raised end of the ramp sections, within which may be accommodated in a non-engaging relationship at least one said support beam thereby isolating load forces associated with said travel upon said raceway between said panels from said panels to prevent wobbling of said panels.

9. The detection system defined in claim 8, wherein said interlocking means includes a leg portion extending from each of said raised abutting ends of said ramp sections, said interlocking means also includes a male member depending from the lower surface of said first end and said second end of said central platform section, and each of said leg portions has a generally U-shaped female member opening towards said depending male member, whereby pressure engagement of each of said male members with each of said female members causes said sections to interlock.

10. The detection system defined in claim 9, wherein each male member includes a tooth and each female member includes a tooth, which come in pressure contact with one another to lock each of said female members and each of said male members together.

11. The detection system defined in claim 10, further comprising a bearing surface associated with said raised abutting ends of said ramp sections, and said first end and said second end of said central platform section to provide ease of assembly.

12. The detection system defined in claim 8, wherein said girder structure means is of generally E-shaped configuration and opens toward said central platform section lower surface to define two passageways therein.

13. The detection system defined in claim 8, wherein said first ramp section and said second ramp section include a plurality of rib members to reduce the overall weight of said raceway.

14. The detection system defined in claim 8, wherein said sections are adapted to include two channels, one of said channels running along said central platform section lower surface near said first end, and said other channel running along said central platform section lower surface near said second end to accommodate a pair of support beams.

* * * * *